Dec. 12, 1944.  W. T. PERKINS  2,364,811
OPTICAL INSTRUMENT
Filed April 7, 1943

WILLARD T. PERKINS
INVENTOR.

BY
ATTORNEYS

Patented Dec. 12, 1944

2,364,811

UNITED STATES PATENT OFFICE 2,364,811

OPTICAL INSTRUMENT

Willard T. Perkins, Irondequoit, N. Y., assignor to Bausch & Lomb Optical Company, Rochester, N. Y., a corporation of New York Application April 7, 1943, Serial No. 482,111

9 Claims. (Cl. 88—34)

This invention relates to optical instruments such as telescopes and more particularly to binocular telescopes.

In binoculars heretofore proposed, the eyepiece or ocular tube has been carried by a mounting tube usually threaded into a suitable socket formed in the body of the instrument. The cap forming the end closing wall of the body has been provided with an aperture to permit the one end of the mounting tube to be inserted therethrough at the time of its assembly with the body. It has been difficult to seal this aperture and moisture gaining access into the body through this joint brought about a corrosion of the binocular parts and moisture condensation on optical surfaces in the end reduced vision through the binocular.

Furthermore, unless extreme care was taken in the thread cutting operations, it was difficult to mount the eyepiece with the axis thereof in proper position relative to the axis of the other optical elements carried by the body.

In the instrument of the present invention, this difficulty has been obviated for the mounting tube is made integral with the detachable cap forming the end wall of the binocular and thus the aperture on the outer surface of the binocular has been eliminated.

In the now preferred form of the present invention, the mounting tube not only affords means for mounting the ocular tube as the latter is telescopically mounted in the mounting tube, but also holds the optical axis thereof in a predetermined aligned position. The holding means now preferred comprises a relatively large annular bearing surface formed interiorly of the mounting tube and closely engaging the outer surface of the ocular tube which is formed with a correlated accurately machined surface.

To permit the eyepiece to be focused, the exterior surface of the ocular tube is formed with a thread and to simplify manufacturing procedure a ring fixed in the mouth of the mounting tube is formed with the engaging thread. As the interior surface of the mounting tube is not threaded, the entire surface can be used as a bearing surface for supporting the ocular tube.

The coaction between the two surfaces not only aligns the eyepiece relative to the mounting tube and holds the same in alignment after the tubes have been assembled, but also tends to seal the union between the tubes. Thus the step of aligning the ocular tube with the mounting tube is reduced to a simple assembly operation easily completed by the ordinary workman.

The cap forming the end wall of the body of the binocular of the present invention is secured to the body by any suitable fastening means threaded into tapped openings formed in lugs integrally formed with the interior wall of the body. The surfaces of the lugs are accurately machined coplanar and the plane thereof forms a reference plane for locating the optical elements of the instrument.

As the integral tube of the cap actually carries and is used to align the eyepiece relative to the other optical elements of the instrument, it is important that the cap when mounted on the body occupy a predetermined position relative to the reference plane formed by the coplanar faces of the lugs of the body. Otherwise, the optical axis of the eyepiece would not be in proper alignment with the optical axis of the other optical elements of the instrument when the cap was mounted on the body.

To align the cap properly with the reference plane of the body, the cap is formed with accurately machined coplanar surfaces adapted to engage the machined surfaces of the lugs carried by the body when assembled therewith. As the eyepiece is properly positioned in the mounting tube, the assembly of the body and cap brings the optical axis of the eyepiece into alignment with the axis of the other optical elements previously assembled with the body.

Thus the alignment of the optical axis of the eyepiece with the axis of the other optical elements of the instrument is not left to the skill of a workman as in the prior assembly of instruments of this type. As skilled workmen are no longer needed to complete the assembly, considerable reduction is effected in the cost of the instrument for the cost of assembly has constituted a relatively large portion of the cost of the finished instrument.

As the surfaces of the lugs are used as the reference plane for the optical elements of the instrument, a very effective seal can be had by merely placing a gasket about the end of the body closed by the cap and forming the gasket of a thickness such that it will be compressed when the surfaces of the cap are drawn down against the surfaces of the lugs.

Other features and advantages of the instrument of the present invention will appear from the following description taken in connection with the accompanying drawing in which.

Figure 1:
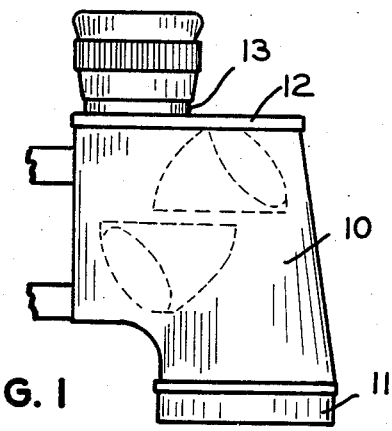
Fig. 1 is an elevational view of one body unit of the binocular of the present invention.

To simplify the drawing, as both body units of the instrument of the present invention are identical, only one unit has been illustrated. It is to be understood, however, that the instrument comprises two body units which, if desired, may be pivotally secured together to allow the body units to be adjusted so that the eyepieces thereof may be spaced apart the necessary pupillary distances to meet the requirements of various users.

In the now preferred form of the present invention, the body 10 of the instrument is preferably formed with the opposite ends open to permit the prism assembly carried within the body to be more easily assembled therewith. The one end of the body 10 is enclosed by an objective assembly 11 and, if desired, the objective assembly may be one such as shown and described in U. S. Patent No. 959,739.

The opposite end of the body is enclosed by a cap 12 having integrally formed therewith a tube 13 extending outwardly thereof. The tube 13 forms a mounting means for mounting the ocular tube 14, carrying the eyepiece of the instrument, to the body 10.

To align the axis of the ocular tube 14 with that of the mounting tube 13, the interior surface of the tube 13 is accurately machined so that the axis thereof is normal to the plane of a plurality of coplanar surfaces 15 formed on the underside of the cap 12. The outer surface of the ocular tube 14 engaged by the interior surface of the mounting tube is also machined so as to be substantially concentric with the interior surface of the mounting tube. Thus, the interior surface of the mounting tube 13 forms a relatively large bearing surface which through engagement with the surface of the ocular tube holds the axis of the same in a predetermined position relative to the plane of the coplanar surfaces 15.

The eyepiece of the instrument of the present invention may be focused by moving the ocular tube 14 carrying the lens elements of the eyepiece relative to the mounting tube 13 and to this end the exterior surface of the ocular tube 14 is formed with a shallow rectangular thread 16 engaged by a matching thread carried by a ring 17 fixed in the mouth of the mounting tube 13. Although the ring 17 can be fixed within the bore of the tube 13 by any means desired, in the form of the invention now preferred, the ring is threaded into the mouth of the tube 13, the pitch of this threaded connection being such that it will be impossible for the ring to back out of the mounting tube when the ocular tube is telescopically moved outwardly of the mounting tube.

In the assembly operation, the threaded ring 17 is threaded into the mounting tube and thereafter the ocular tube 14 is mounted within the tube 13 through the threaded arrangement heretofore described. As the surfaces of the mounting tube and ocular tube will align and hold in alignment the assembled tube, the step of aligning the ocular tube relative to the mounting tube is reduced to a simple assembly operation completed without the employment of skilled assembly operators.

As the ocular tube is mounted to the cap before its assembly with the body, any small chips which might be cut by the meshing thread as the ring 17 is threaded into the tube 13, and as the ocular tube 14 is assembled with the mounting tube 13, are not caught within the body. In prior devices where the mounting tube was threaded into the socket formed in the body, these chips dropped into the body and often settled, if not removed, on the surfaces of the optical elements mounted within the body.

To indicate the position of the ocular tube in all adjustments thereof relative to the mounting tube 13, a band 18, having a suitable diopter scale 19 formed thereon, is fixed to the ocular tube and rotates therewith. The scale 19 cooperates with an index mark 20 formed on the mounting tube 13. In the illustrated form of the invention, the band 18 is threaded to the upper end of the tube 14 and is fixed thereto by means of small set screws 21. An eyecup 22 is threaded onto the outer surface of the band 18 and conceals the heads of the screws 21.

After the ocular tube 14 has been assembled with the mounting tube 13 of the cap 12, the cap is then secured to the body 10 of the instrument. Although the cap might be secured to the body in a number of ways, in the embodiment of the present invention now preferred, referring now to Fig. 2, the cap is fixed to the body by means of screws 23 passed through suitable openings formed in the cap 12 and threaded into tapped openings 24 formed in lugs 25, preferably formed integral with the wall of the body 10. The end surfaces 26 of the lugs 25 are very accurately machined coplanar and form a reference plane for mounting the optical elements of the body. The surfaces 26 lie in a plane displaced from the plane of the end wall 27 of the instrument and are used to locate and fix the surfaces 15 of the cap 12. Thus, when the cap is secured to the body with the surfaces 15 engaging the surfaces 26, the cap will be held in the desired position relative to the body 10.

As the axis of the ocular tube is held normal to the plane of the surfaces 15 by the bearing surface of the mounting tube and the position of the cap relative to the body fixed by engagement of the surfaces 15 and 26, the assembly of the cap to the body will mount the ocular tube with its axis in the desired position relative to the other optical elements of the instrument.

The plane of the surfaces 26 is displaced from the plane of the end surface 27 of the body member and a gasket 28 may be placed about the end surface 27 and compressed between the interior surface of the cap and the end surface of the body member when the cap is secured to the latter. As the end surface 27 of the body is not used as a reference plane for locating the optical elements of the instrument, the gasket can be formed of such a thickness and be so compressed that a very effective seal can be had without the fine assembly adjustment heretofore necessary where the end surface of the binocular body has been used as the reference plane. This is due to the fact that it is not necessary to equally compress the gasket over the entire end surface to insure that the cap will be equally spaced from the end surface, for in the instrument of the present invention, the gasket is merely made thick enough so that it will be compressed sufficiently to bring about a seal when the screws 23 are tightened to draw the surfaces 15 of the cap down against the surfaces 26 of the lugs 25.

To augment the seal of the gasket, the exterior wall of the body member 10 is formed with a groove which is filled with a wax bead 29 prior to the assembly of the cap to the body. It will be seen, referring again to Fig. 2, that the wax will seal the annular joint between the exterior wall of the body 10 and the inner surface of the flange 30 of the cap 12.

To further seal the interior of the body against moisture, the ocular tube 14 is formed with an annular groove which is filled with a packing material 31. It will be seen that the material 31 will tend to seal the telescopic connection of the tubes 13 and 14.

Figure 2:
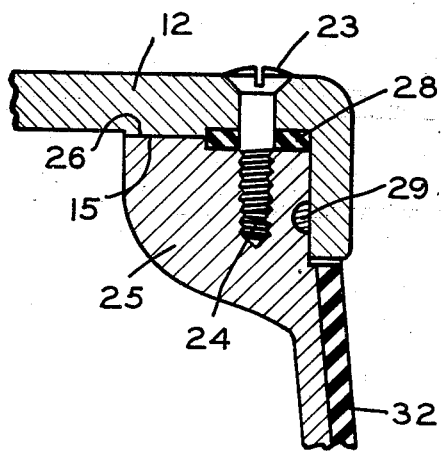
Fig. 2 is a sectional view illustrating a fragmentary part of the instrument of the present invention and showing one of the lugs with the surface of the cap in engagement with the surface thereof.
Figure 3:
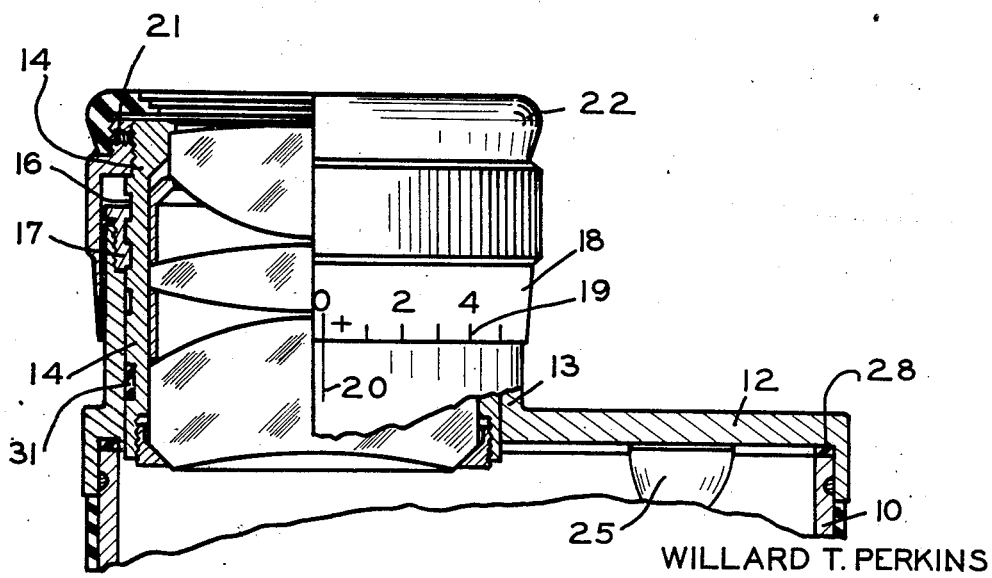
Fig. 3 is a sectional view, partly in elevation, of the ocular assembly of the instrument of the present invention.

The exterior surface of the body member may be coated with some suitable moisture-proof covering such as rubber or Vinylite, as shown at 32 in Fig. 2.

It will be now seen that the instrument of the present invention may be assembled by relatively unskilled workmen, which brings about a reduction in the cost of the assembly of the instrument, resulting in a considerable saving in the cost of the instrument for the assembly cost constitutes a relatively large part of the cost of the finished instrument.

While one embodiment of the invention has been disclosed, it is to be understood that the invention need not be limited to the device as described but is susceptible of modification falling within the spirit of the invention and the scope of the appended claims.

I claim:

1. In an optical instrument of the type described, a body having an open end; a cap closing the open end of said body; a plurality of coplanar surfaces on the undersurface of said cap; a tubular member formed integral with said cap, the axis of said tubular member being disposed in a predetermined position relative to the plane of said surfaces; a plurality of coplanar surfaces formed on said body and directly engaging the surfaces of said cap, the surfaces of said cap cooperating with the surfaces of said body for positioning the axis of said tubular member in a predetermined position relative to said body; and compressible gasket means positioned between parts of the cap and body so as to form a tight seal therebetween, the gasket means being spaced away from the coacting coplanar surfaces.

2. In an optical instrument of the type described, a body having an open end; a cap closing the open end of said body; a plurality of coplanar surfaces on the undersurface of said cap; a tubular member formed integral with said cap, the axis of said tubular member being disposed in a predetermined position relative to the plane of said surfaces; an ocular tube telescopically mounted in said tubular member; surface means formed on the interior wall of said tubular member, said surface means being concentric with the axis of said tubular member; correlated surface means formed on said ocular tube and cooperative with the surface means of said tubular member to hold the axis of said ocular tube coincident with the axis of said tubular member; and a plurality of coplanar surfaces formed on said body and directly engaging the surfaces of said cap, the surfaces of said cap cooperating with the surfaces of said body for positioning the axis of said tubular member in a predetermined position relative to said body.

3. In an optical instrument of the type described, a body open at one end thereof, an optical element carried by said body having a fixed optical axis; a cap for closing the open end of said body; a tubular member formed integral with the cap; an ocular tube carrying at least one optical element having an axis fixed relative to said ocular tube; means for telescopically mounting said ocular tube within said tubular member for movement axially thereof; means for holding the axis of said optical element carried by said ocular tube coincident with the axis of said tubular member; and surface means carried by said cap and directly engaging cooperative correlated surface means carried by said body for holding said cap and body in a predetermined relative position wherein the axis of said tubular member is held in a desired position relative to the optical axis of the element carried by said body.

4. In an optical instrument of the type described, a body having one end open; a cap for closing the open end of said body; a tubular member formed integral with the cap, the interior wall of said tubular member being formed concentric with the axis of said tubular member; an ocular tube comprising at least one lens element having a fixed optical axis; means for telescopically mounting said ocular tube within said tubular member with the optical axis of said element coincident with the axis of the interior surface of said tubular member; an optical element carried by said body having a fixed optical axis; a plurality of coplanar surfaces formed integral with said body member; correlated surfaces carried by said cap, the plane of said surface being normal to the axis of said tubular member, said surfaces adapted to be held in engagement with the surfaces of said body whereby said surfaces cooperate to hold said cap and body in a predetermined relative position wherein the optical axis of the element of said ocular tube is held in a desired position relative to the optical axis of the element of said body.

5. In an optical instrument of the type described, a body open at one end thereof; an optical element carried by said body having an optical axis fixed relative to said body; a plurality of coplanar surfaces formed on said body adjacent to the open end thereof, the plane of said surfaces being normal to the optical axis of the elements; a cap for closing one end of said body; a tubular member formed integral with the cap; an ocular tube having an optical element with a fixed optical axis telescopically received by said tubular member for movement axially thereof; means for holding the optical axis of said last-named element coincident with the axis of said tubular member during relative movement therebetween; and means on said cap and cooperative with the coplanar surfaces of said body for holding said cap in a position relative to said body wherein the optical axis of the last-named element is held in a desired position relative to the optical axis of the element carried by said body.

6. In an optical instrument of the type described, a body having an open end; a cap closing the open end of said body; a plurality of coplanar surfaces on the undersurface of said cap; a tubular member formed integral with said cap, the axis of said tubular member being disposed in a predetermined position relative to the plane of said surfaces; an ocular tube carrying at least one optical element and having an exterior surface formed with a thread, the unthreaded portion of said surface being formed concentric with the optical axis of said element; an annular bearing surface formed on the interior wall of said tubular member concentric with the axis thereof; an annular member fixed in the mouth of said tubular member; a thread formed on the interior surface of said annular member, the thread of said ocular tube adapted to engage the thread of said annular member whereby said ocular tube is telescopically received by said tubular member for movement axially thereof, the bearing surface of said tubular member engaging the exterior surface of said ocular tube and holding the same in all adjusted positions thereof with the optical axis of said element coincident with the axis of said tubular member; and a plurality of coplanar surfaces formed on said body, the surfaces of said cap cooperating with the surfaces of said body for positioning the axis of said tubular member in a predetermined position relative to said body.

7. In an optical instrument of the type described, a body having an open end; a cap closing the open end of said body; a plurality of coplanar surfaces on the undersurface of said cap; a tubular member formed integral with said cap, the axis of said tubular member being disposed in a predetermined position relative to the plane of said surfaces; an ocular tube telescopically mounted in said tubular member for movement axially thereof; means for holding the axis of said ocular tube coincident with the axis of said tubular member; a plurality of coplanar surfaces carried by said body, said last-named surfaces being disposed adjacent the end wall of said body at the open end thereof and extending above the surface of said end wall; and a gasket of compressible material carried by the end wall of said body, said gasket having a thickness greater than the distance between the coplanar surfaces of the body and the surface of the end wall thereof whereby said gasket is compressed when the cap is secured to the body with the coplanar surfaces in facewise engagement.

8. In an optical instrument of the type described, a body open at one end thereof; a cap for closing said open end; a tubular member formed integral with the cap; an ocular tube telescopically received by said tubular member for movement axially thereof; means for holding the axis of said ocular tube coincident with the axis of said tubular member; a plurality of coplanar surfaces formed on said cap; a plurality of lugs carried by the interior wall of said body and extending inwardly thereof adjacent said open end; a uniplanar surface formed on each lug, said surfaces being coplanar and extending beyond the surface of the end wall of said body; a gasket of compressible material mounted on the surface of said end wall and having a thickness greater than the distance the coplanar surfaces extend beyond the surface of the end wall; and means for securing the cap to said lugs with the surfaces of said cap in facewise engagement with the surfaces of said lugs.

9. In an optical instrument of the type described, a body tube having an open end; a cap for closing the open end of the body tube; a tubular member formed integral with the cap; an ocular tube axially movable within said tubular member and having its axis coincident with the axis of the tubular member; means on the inner face of said cap defining a plane which is perpendicular to the axis of said ocular tube; means carried adjacent the open end of said body tube for defining a plane, the means on the cap being in contact with the means on the body tube whereby the axis of the ocular tube is located in a plane perpendicular to the plane established by the means on the body tube and cap; and compressible gasket means for forming a tight seal between the cap and the body tube, said gasket means being spaced from the plane-defining means on said cap and body tube.

WILLARD T. PERKINS.